United States Patent Office 3,353,992
Patented Nov. 21, 1967

3,353,992
COATING OF POLYMER FILM AND SHEET
Dallas G. Grenley, Midland, and Harold J. Townsend, Saginaw, Mich., assignors to The Dow Chemical Company, Midland, Mich., a corporation of Delaware
No Drawing. Filed Mar. 9, 1964, Ser. No. 350,559
10 Claims. (Cl. 117—138.8)

ABSTRACT OF THE DISCLOSURE

A composite article comprising a polymer substrate, preferably in the form of films or sheet, having on at least one surface a coating of a copolymer consisting principally of vinylidene chloride with lesser amounts of at least two monomers from the group consisting of acrylates, methacrylates, acrylonitrile, vinyl chloride and butadiene, although binary copolymers can be used.

This invention relates to coating. It more particularly relates to barrier coatings and the method for the preparation of the coated article using polymers of vinylidene chloride.

Vinylidene chloride polymers are widely used as barrier coatings and heat seal coatings on a wide variety of shaped articles such as film, sheet, and the like. Such coatings are utilized on substrates such as paper, thermoplastic resinous film, and foils, both metal and resinous. However, such coatings usually are expensive to apply and tend to be costly. Generally for optimum properties such coatings must be deposited from a lacquer or as a film forming latex. Such coatings generally are crystalline in nature and oftentimes after application show a tendency to shrink and alter their physical characteristics due to the formation of a crystalline character. Such crystallinity may develop after a considerable period of time has elapsed since the coating has been placed on the substrate or alternately in some instances the coating almost immediately crystallizes.

It is an object of this invention to provide an improved coated article and a method for the preparation of such a coated article.

It is a further object of this invention to provide an improved coating technique using vinylidene chloride polymers.

A further object of the invention is to provide a composite packaging film having increased stability.

These benefits and other objects in accordance with the invention are achieved by providing a composite article comprising a substrate with a coating of a copolymer containing in chemically combined form, (a) from 80-87 percent by weight of vinylidene chloride, (b) from 8-20 percent by weight of a monomer selected from the group consisting of methyl acrylate, methyl methacrylate, acrylonitrile, ethyl acrylate, and mixtures thereof, and (c) from 0-5 percent of a member selected from the group consisting of alkyl acrylates wherein the alkyl group contains from 2-22 carbon atoms, vinyl chloride, butadiene and mixtures thereof with the further limitation that the group of (c) be 3-22 carbon atoms when (b) is ethyl acrylate and that such copolymer shall show no appreciable change in the stress-strain relationship of a polymer film cast from a latex and stored at a temperature of between 0 and 50° centigrade. The resultant polymer shall absorb less infrared radiation at a wave length of 9.58 microns than at a wave length of 9.45 microns.

The method of the invention comprises depositing upon the surface of a shaped article to be coated a latex of the hereinbefore described polymeric composition and drying the coating by means of heat applied to the coating by conduction, radiation, or alternately a combination of conduction and radiation, i.e., a nonconduction technique at a temperature sufficiently high to provide a continuous coating.

The copolymers for use in the practice of the present invention are readily prepared by conventional polymerization methods well known to the art wherein latexes or metastable dispersions of the polymer are obtained in an aqueous vehicle. Typically such latexes have particle sizes ranging from about 300 angstroms to about 3000 angstroms and a relatively low viscosity, that is, without the addition of thickeners, a latex containing 50 percent by weight polymer solids has a viscosity of less than about 10 centipoise. A wide variety of substrates are beneficially treated with coatings in accordance with the present invention. The substrates include paper of the coated and uncoated variety as well as paper prepared from fibers other than wood cellulose, metal foils such as those obtained from aluminum and gold foil. Substrates which are advantageously coated include synthetic resinous film and foils such as those prepared from the resinous polyolefins such as polyethylene, polypropylene, and resinous copolymers thereof including both the branched and linear variety, and alkenyl aromatic resinous film. By the term "film" is meant a thin sheet of film having a thickness up to about 10 mils and beneficially up to about 5 mils. By the term "alkenyl aromatic resinous" is meant a solid polymer of one or more polymerizable alkenyl aromatic compounds. The polymer or copolymer comprises, in chemically combined form, at least 50 percent by weight of at least one alkenyl aromatic compound having the general formula:

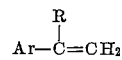

wherein Ar represents an aromatic hydrocarbon radical, or an aromatic halohydrocarbon radical of the benzene series, and R is a hydrogen or the methyl radical. Examples of such alkenyl aromatic resins are the solid homopolymers of styrene, α-methylstyrene, ortho-methylstyrene, meta-methylstyrene, para-methylsyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as divinylbenzene, methyl-methacrylate, or acrylonitrile, etc.

The practice of the invention is also successful with other thermoplastic resinous materials well known to the art, including those which may be comprised of polymers and copolymers of methyl methacrylate, such as its homopolymer and the copolymers thereof with vinylidene chloride; thermoplastic polymers and copolymers of vinyl chloride, including homopolymeric vinyl chloride, thermoplastic ester and ether derivatives of cellulose including cellulose acetate, cellulose propionate, cellulose acetate butyrate, ethyl cellulose, and the like. Other hydrophobic thermoplastic resins which beneficially are treated by the present coating are: chlorinated polyolefins such as chlorinated polyethylene, chlorinated polypropylene, and the like, as well as Saran resins, which include thermoplastic copolymers of vinylidene chloride with one or more such monomers as vinyl chloride, acrylates and esters such as ethyl acrylate, ethylpropylate, and the like.

Also beneficially treated in accordance with the present invention are films from the synthetic linear polyesters. Synthetic linear polyesters are prepared by reacting terephthalic acid, dialkyl terephthalates, or ester-forming derivatives thereof with a glycol of the series

where $n$ is a whole number within the range of 2-10.

They may also include up to 20 percent by weight of a second acid or ester thereof, said second acid being selected from the group consisting of isophthalic acid, dibenzoic acid, hexa-hydro-terephthalic acid, adipic acid, sebacic acid, azelaic acid, naphthalic acid, 2,5-dimethyl terephthalic acid, and bis-p-carboxyphenoxy ethane. The polyamides such as "Nylon 6, 66, 7," and the like are also successfully treated in accordance with the invention.

The coating polymers which are operable in the present invention fall into roughly two categories, those that are relatively hard, and those that are less hard. The harder polymers include those containing the largest portion of vinylidene chloride, that is, ranging from about 84–87 percent, and the softer ones generally have from 80–84 percent vinylidene chloride. This hardness, however, may be modified in accordance with well known principles by selecting the suitable comonomers. Thus, if maximum block resistance and hardness of the coating is desired, a vinylidene chloride-methyl methacrylate copolymer is the hardest of the materials, whereas higher proportions of ethyl acrylate and the higher acrylates tend to decrease the hardness as well as does the incorporation of minor quantities of butadiene. The latexes employed in the present invention are not film forming at room temperature (about 25° centrigrade), without being plasticized. Plasticized latexes which form continuous film at 25° centigrade are beyond the scope of the present invention as they do not provide adequate barrier properties or the stability and advantages that are achieved utilizing the hereinbefore delineated copolymers.

The latexes in accordance with the invention prior to coating may be formulated in accordance with well known principles with such additives as are desired for the particular end use. Thus, dyes, pigments, fillers, and slip agents such as talc and wax may be incorporated within these latexes without destroying their essential characteristics. Advantageously, waxes are added in order to obtain block-free coatings at 50° centigrade in a proportion of from about 2–10 percent by weight of the total solids of the coating composition. Most beneficially, such waxes are employed at a level of about 3–6 percent. Beneficially, such waxes are prepared by an emulsion inversion technique wherein a wax is melted and an anionic surface active agent or soap is incorporated therein at a proportion of about 5–30 percent by weight of the total weight of the wax. Among the suitable soaps are morpholine stearate, potassium oleate, sodium oleate and the like. When the molten wax and the soap have formed a uniform mixture the wax is added to water with high speed agitation to form an emulsion or suspension of the wax in water. The emulsified wax has an average particle diameter of from about 0.5 to about 2 microns and advantageously a range of from about 0.1–0.5 micron. Finely divided talc is oftentimes dispersed in a proportion of from about 0.1–5 percent by weight of the total weight of the composition and preferably from about 1 to 3 percent by weight in order to provide improved slip characteristics such as maintaining a coefficient friction of the resultant film relatively constant up to a temperature of about 60° centigrade. In coating the articles it is generally desirable to coat at a temperature between about 5 and 30° centigrade. This may be accomplished by brushing, dipping, spraying, the use of transfer rolls, and other conventional well known means. After the article is coated, it is essential and critical that the coating remain wet until the temperature of the polymer particles has reached a film forming temperature. Thus, convection heating with dry air is unsatisfactory, as the water is evaporated and the particles cooled below their film forming temperature and a dry, dusty, non-continuous coating results. The coatings are preferably fused and dried by means of radiant heat applied to either side of the substrate and/or conduction heat applied to the side of the substrate remote from the coating.

A combination of both techniques is readily and successfully employed. Thus, the water in the latex together with the resin particles are heated to a film forming temperature. The water may then leave as vapor and a smooth continuous coating results. Generally such coatings are dried at a temperature just below the temperature which the substrate will conveniently stand, if the substrates are oriented synthetic resinous materials such as polystyrene, polypropylene, and the like. The precise surface temperature at which such drying is done is unknown because of the extremely complicated physical phenomena occurring on the surface of the drying film. However, air temperatures and indications from surface pyrometers suggest that the drying temperatures of the film often range between about 140° Fahrenheit and 200° Fahrenheit when oriented polystyrene film is utilized as a substrate.

The coatings, when fused by means of radiant or conduction heating, that is, any heat source which is not a convection heat source, provides an excellent continuous coating.

By way of further illustration, latexes of polymers having the compositions set forth in the following table are prepared.

| Weight Proportion | Monomers |
| --- | --- |
| 13/2/85 | Acrylonitrile/2-ethylhexyl acrylate/vinylidene chloride. |
| 10/5/85 | Acrylonitrile/butyl acrylate/vinylidene chloride. |
| 14/6/80 | Acrylonitrile/butyl acrylate/vinylidene chloride. |
| 15/5/80 | Methyl methacrylate/octyle acrylate/vinylidene chloride. |
| 7/9/84 | Methyl acrylate/octyl acrylate/vinylidene chloride. |
| 13/2/85 | Acrylonitrile/octyl acrylate/vinylidene chloride. |
| 10/5/2/83 | Acrylonitrile/octyl acrylate/vinyl chloride/vinylidene chloride. |
| 10/3/87 | Ethyl acrylate/butyl acrylate/vinylidene chloride. |
| 10/5/2/83 | Acrylonitrile/octadecyl acrylate/butadiene/vinylidene chloride. |

The resultant latexes are 50 weight percent solids. Portions of the latex are dried by radiant heat to form a 2 mil thick film which is employed for evaluation purposes. A portion of the film is examined using an infrared spectroscope and the absorption at 9.58 microns and at 9.45 microns is observed, and in each case, less absorption is noted at 9.58 microns. The X-ray scattering indicates no crystallinity of the samples. Portions of the samples are stored at a temperature of 50° centigrade for 6 months at 50 percent relative humidity and re-examined by infrared and X-rays technique. No change is observed. Stress-strain curves also generated on samples of film both before and after storage and no change is observed. Each of the latexes is used to coat an oriented polystyrene film having a thickness of about 1 mil. Each of the latexes is formulated in the following manner prior to coating. A thousand parts by weight of latex (50 weight percent solids) is treated with 22 parts of a 10 weight percent aqueous ammonia solution. To this is added 125 parts of a carnauba wax dispersion (20 percent by weight wax), 14.3 parts of an aqueous talc dispersion, (35 percent talc) and 5 parts of a 10 percent solution of sodium oleate to assist in the dispersion of the talc. The formulated latexes are cast as a wet film onto a polystyrene substrate at a thickness sufficient to provide a dry coating 0.2 mil in thickness. The wet film is dried by passing through a radiant heat oven for a sufficient length of time to form a continuous adherent without causing the oriented polystyrene to shrink or deorient. The resultant coatings were block-free, readily heat sealable, and exhibit improved barrier properties. They are also clear, transparent, and continuous.

In a manner similar to the foregoing illustration, the formulated latexes are coated onto 1 mil thick oriented polypropylene film, oriented polyethylene film, a film prepared from a copolymer of 85 percent vinylidene chloride and 15 percent by weight vinyl chloride, a 3 mil thick ethyl cellulose film, a 1 mil thick cellulose acetate butyrate film, 0.75 mil thick polyethylene phthalate, polycaprolactam, 20 pound kraft paper aluminum foil and birch veneer steel foil and the like with commensurate results. Frequently, in order to promote adhesion of the coating to the substrate, various surface treatments are employed including corona discharge, ozonization, sulfonation, intermediate prime coats and like techniques well known in the art.

As is apparent from the foregoing specification, the article and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A composite article comprising a polymer substrate of a monoethylenically unsaturated hydrocarbon selected from the group consisting of polystyrene, polypropylene and polyethylene, and having on at least a portion of the surface thereof a coating consisting essentially of a copolymer containing in chemically combined form (a) from 80 to 87 percent by weight of vinylidene chloride, (b) from 8 to 20 percent by weight of a monomer selected from the group consisting of methyl acrylate, methyl methacrylate, acrylonitrile, ethyl acrylate and mixture thereof, and (c) from 2 to 9 percent by weight of at least one monomer selected from the group consisting of alkyl acrylates wherein the alkyl group contains from 2 to 22 carbon atoms, vinyl chloride, butadiene and mixtures thereof, with the proviso that the acrylate monomer of (c) contains from 3 to 22 carbon atoms when the monomer of (b) is ethyl acrylate, and with the further limitation that said copolymers show no appreciable change in the stress-strain relationship of a polymer film when cast from a latex and stored at a temperature of between 0 and 50° centigrade and the polymer film so cast shall absorb less infrared radiation at a wave length of 9.58 microns than at a wave length of 9.45 microns.

2. The article of claim 1 wherein the substrate is a film and the total thickness of the substrate and the coating is up to about 5 mils.

3. The article of claim 1 wherein the substrate is a polystyrene film and the coating consists of 85 parts of vinylidene chloride, 13 parts of acrylonitrile and 2 parts of octyl acrylate.

4. The article of claim 3 wherein the substrate comprises an oriented polystyrene film having a thickness of about 1 mil and the coating has a thickness of about 1/10 of a mil.

5. The article of claim 1 wherein the substrate is a polystyrene film having a thickness of about 1 mil and the coating is adhered to each major face thereof and has a thickness of about 1/10 of a mil.

6. A method of coating a shaped article of a polymer substrate of a monoethylenically unsaturated hydrocarbon selected from the group consisting of polystyrene, polypropylene and polyethylene, which method comprises depositing on the surface of the shaped article to be coated an aqueous dispersion of a copolymer containing in a chemically combined form, (a) from 80 to 87 percent by weight of vinylidene chloride, (b) from 8 to 22 percent by weight of a monomer selected from the group consisting of methyl acrylate, methyl methacrylate, acrylonitrile, ethyl acrylate and mixtures thereof, and (c) from 2 to 9 percent of at least one monomer selected from the group consisting of alkyl acrylates wherein the alkyl group contains from 2 to 22 carbon atoms, vinyl chloride, butadiene and mixtures thereof, with the proviso that the acrylate monomer of (c) contains from 3 to 22 carbon atoms when the monomer of (b) is ethyl acrylate, and with the further limitation that such copolymer shall show no appreciable change in the stress-strain relationship of a polymer film cast from a latex and stored at a temperature of from about 0 to 50° centigrade and the copolymer shall absorb less infrared radiation at a wave length of 9.58 microns than at a wave length of 9.45 microns and subsequently drying the aqueous coating by means of heat applied to the coating by radiation, conduction or radiation and conduction techniques at a temperature sufficiently high to provide a continuous coating.

7. The method of claim 6 wherein the aqueous coating is provided in a quantity sufficient to deposit on the substrate a dry coating having a thickness of about 1/10 of a mil.

8. The method of claim 6 wherein the coating is dried by means of a combination of conductive and radiant heat.

9. The method of claim 6 including the step of adding to the aqueous coating prior to application to the substrate an aqueous dispersion of a wax.

10. The method of claim 6 wherein the coating is dried by the application of heat to the side of the substrate remote from the coated side.

References Cited

UNITED STATES PATENTS

| | | |
|---|---|---|
| 3,021,229 | 2/1962 | Morgan. |
| 3,022,198 | 2/1962 | Hahn. |
| 3,041,208 | 6/1962 | Hay et al. |
| 3,058,939 | 10/1962 | Meier. |
| 3,061,883 | 11/1962 | Frank _____ 117—119.6 X |
| 3,108,017 | 10/1963 | Messwarb et al. ____ 117—138.8 |
| 3,124,476 | 3/1964 | Park et al. _____ 117—119.6 X |
| 3,166,435 | 1/1965 | Meier _____ 117—119.6 |
| 3,170,888 | 2/1965 | Kutik et al. |
| 3,236,818 | 2/1966 | Covington. |
| 3,240,742 | 3/1966 | Hahn et al. |
| 3,251,817 | 5/1966 | Hahn et al. |
| 3,255,034 | 6/1966 | Covington et al. |

FOREIGN PATENTS

| | | |
|---|---|---|
| 830,311 | 3/1960 | Great Britain. |

WILLIAM D. MARTIN, *Primary Examiner.*

M. R. LUSIGNAN, *Assistant Examiner.*